United States Patent
Kudva et al.

(10) Patent No.: US 12,106,274 B2
(45) Date of Patent: Oct. 1, 2024

(54) HOSTING E-COMMERCE BASED ON CLOUD COMPUTING

(75) Inventors: Gautham K. Kudva, Flower Mound, TX (US); Benjamin Franklin Clay, LaGrange, NC (US); Jessica Samantha Piikklia, Plano, TX (US); Robert O. Morrow, Frisco, TX (US); Dennis Raae Mercer, Jr., Coppell, TX (US); Junli Yuan, Plano, TX (US); Victor Alexeenko, Carrollton, TX (US); Anthony Glenn Aylor, Frisco, TX (US); Mark Louis Gerard, McKinney, TX (US); Robert Parker Freeburg, II, Carrollton, TX (US); Michael David Reynolds, Parker, TX (US)

(73) Assignee: Blackhawk Engagement Solutions (DE), Inc., Lewisville, TX (US)

( * ) Notice: Subject to any disclaimer, the term of this patent is extended or adjusted under 35 U.S.C. 154(b) by 1121 days.

(21) Appl. No.: 13/438,593

(22) Filed: Apr. 3, 2012

(65) Prior Publication Data

US 2013/0060657 A1    Mar. 7, 2013

Related U.S. Application Data

(60) Provisional application No. 61/471,666, filed on Apr. 4, 2011.

(51) Int. Cl.
*G06Q 20/12* (2012.01)
*G06Q 30/00* (2023.01)

(52) U.S. Cl.
CPC ............ *G06Q 20/12* (2013.01); *G06Q 30/00* (2013.01)

(58) Field of Classification Search
CPC ............................... G06Q 20/12; G06Q 30/00
See application file for complete search history.

(56) References Cited

U.S. PATENT DOCUMENTS

| 7,861,077 B1 * | 12/2010 | Gallagher, III | G06F 21/33 |
| | | | 713/155 |
| 2003/0055839 A1 * | 3/2003 | Klatt | G06Q 30/02 |

(Continued)

FOREIGN PATENT DOCUMENTS

EP    2362602 A1 *    8/2011    ............. H04L 63/20

OTHER PUBLICATIONS

Tasting Internet cookies; IOU; Unisys World, Jun. 2002, vol. 23 (6), p. 7.*

(Continued)

*Primary Examiner* — Ilse I Immanuel
(74) *Attorney, Agent, or Firm* — Barnes & Thornburg LLP; Jerry C. Harris, Jr.

(57) ABSTRACT

A method of secure automated communication comprises communicating by a computer with a cloud computing service having an address in a first Internet domain, the communicating performed during a first electronic commerce session using an electronic commerce web page rendered by a browser executing on the computer; communicating by the computer with a transaction server having an address in the first Internet domain via a virtual private network (VPN), the communicating performed during the first electronic commerce session using the electronic commerce web page rendered by the browser; determining when the browser is accessing a product information portion of the electronic commerce web page during the first electronic commerce session; determining when the browser is providing confidential information to the electronic commerce web page during the first electronic commerce session; and directing the confidential information to the transaction server via the virtual private network during the first electronic commerce session.

6 Claims, 6 Drawing Sheets

(56) References Cited

U.S. PATENT DOCUMENTS

| | | | |
|---|---|---|---|
| 2006/0167809 A1* | 7/2006 | Bhambri | G06Q 30/06 |
| | | | 705/59 |
| 2006/0167811 A1* | 7/2006 | Bhambri | G06Q 30/02 |
| | | | 705/59 |
| 2009/0282239 A1* | 11/2009 | Doleh | H04L 63/0815 |
| | | | 713/155 |
| 2011/0004574 A1* | 1/2011 | Jeong | G06N 5/02 |
| | | | 718/104 |

OTHER PUBLICATIONS

Filing receipt and specification for provisional patent application entitled "Hosting E-Commerce Based on Cloud Computing," by Benjamin Franklin Clay, et al., filed Apr. 4, 2011 as U.S. Appl. No. 61/471,666.

* cited by examiner

HOSTING E-COMMERCE BASED ON CLOUD COMPUTING

CROSS-REFERENCE TO RELATED APPLICATIONS

The instant application claims priority to and incorporates by reference for all purposes U.S. provisional patent application No. 61/471,666 filed Apr. 4, 2011, entitled "Hosting E-Commerce Based on Cloud Computing," by Benjamin Franklin Clay, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic commerce or "e-commerce" is a term for any business or commercial transaction that involves the transfer of information across the Internet, including but not limited to retail websites, auction sites, and music sites. E-commerce relates to both transactions between a business and an individual or between two businesses, known as business-to-business (or B2B) commerce. E-commerce is often faster, cheaper and more convenient than the traditional methods.

E-commerce allows for an electronic exchange of goods and services in exchange for an electronic payment. E-commerce typically uses the Internet at least at some point in the transaction's lifecycle and has grown extraordinarily with widespread Internet usage. A large percentage of e-commerce is conducted entirely electronically for virtual items such as access to premium content on a website, but most electronic commerce involves the shipment or transportation of physical goods. Almost all retailers have an e-commerce presence on the Internet.

Part and parcel to e-commerce are the payment systems used to effect such commerce. Typically, a person that is seeking a product or service enters credit or debit card information into a payment screen on a website. In some instances, a wire transfer can also be used to fund an e-commerce transaction. Unfortunately, theft of this electronic payment data has increased with the increase in e-commerce. A breach of security related to the electronic payment data can result in large monetary fines and damages for those entrusted with that financial information.

SUMMARY

In an embodiment, a method of secure automated communication is disclosed. The method comprises communicating by a computer with a cloud computing service having an address in a first Internet domain, the communicating performed during a first electronic commerce session using an electronic commerce web page rendered by a browser executing on the computer; communicating by the computer with a transaction server having an address in the first Internet domain via a virtual private network (VPN), the communicating performed during the first electronic commerce session using the electronic commerce web page rendered by the browser; determining when the browser is accessing a product information portion of the electronic commerce web page during the first electronic commerce session; determining when the browser is providing confidential information to the electronic commerce web page during the first electronic commerce session; and directing the confidential information to the transaction server via the virtual private network during the first electronic commerce session.

In an embodiment, an electronic commerce system is disclosed. The system comprises a cloud computing system provided by a first plurality of computers in a first Internet address domain, wherein the cloud computing system executes a product information application; a secure payment system provided by a second plurality of computers in the first Internet address domain, wherein the secure payment system executes a payment application. The product information application establishes a first electronic commerce session and provides a web page content and a first session cookie identifying the first electronic commerce session to a browser executing on a computer in a second Internet address domain different from the first Internet address domain. The secure payment system receives payment information and the first session cookie from the browser, requests product information associated with the first electronic commerce session from the cloud computing system based on sending the first session cookie to the cloud computing system, receives product information associated with the first electronic commerce session from the cloud computing system, and sends a secured payment transaction to a payment service based on the payment information and based on the product information associated with the first electronic commerce session.

In an embodiment, a method of conducting electronic commerce is disclosed. The method comprises, in response to a request for an electronic commerce web page, a cloud computing system in a first Internet domain initiating a first electronic commerce session. The method further comprises transmitting a first electronic commerce web page and a first session cookie identifying the first electronic commerce session from the cloud computing system, wherein the first electronic commerce web page comprises content describing a product offering or a service offering; transmitting a second electronic commerce web page and the first session cookie from the cloud computing system, wherein the second electronic commerce web page comprises an embedded web page that is configured to provide confidential information to a transaction server in the first Internet domain without passing through the cloud computing system; and receiving confidential information provided via the embedded web page and the first session cookie by the transaction server. The method further comprises sending a request for product offering or service offering information comprising the first session cookie by the transaction server to the cloud computing system; receiving product offering or service offering information by the transaction server from the cloud computing system; and sending a payment transaction message by the transaction server to a payment service outside of the first Internet domain.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

DETAILED DESCRIPTION

It should be understood, at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The disclosure teaches an e-commerce system that provides for a unified purchasing experience. This unified purchasing experience is supported by one or more applications executing in a cloud computing environment to provide informational services and fulfillment services and is supported by a secure environment to complete payment transactions. The secure environment is linked to a user browser via a virtual private network (VPN) communication link over which confidential information is transmitted. The unified purchasing experience if promoted by the cloud computing service and the secure environment being part of and/or accessed via the same Internet domain name. The e-commerce system may be presented to a user, for example a purchaser, as a unified e-commerce website or web page. An embodiment employs a web browser capable of determining when a computer user is interacting with the product information portion of the e-commerce website, i.e., when the user is searching through a product catalog, product pages, or services pages of the e-commerce website, from when the user is attempting to complete a purchase from the e-commerce website involving sharing confidential payment information and shipping address information. When the user seeks to complete a purchase from the website, the browser redirects the outgoing information over a virtual private network (VPN) to a transaction server. The web browser may also prevent the cloud computing service from becoming aware of the exact address of the transaction server.

In an embodiment, this redirection is provided by a web page and/or input fields embedded in an electronic commerce web page. In an embodiment, this redirection is provided by an inline frame and/or iframe embedded in the electronic commerce web page, for example a payment page of the electronic commerce web site. As would be appreciated by one skilled in the art, an iframe can provide information and/or controls of a different web page without reloading the page—it looks as if it is part of the existing page. The iframe further supports providing information input into the iframe not to the location associated with the surrounding or embedding web page but instead to a separate transaction server associated specifically with the iframe. In the present case, the iframe can be used to send the confidential information via a virtual private network tunnel to a secure environment such that the confidential information is not transmitted to or through the cloud computing environment. Assuring that confidential information flows only via the virtual private network tunnel to the secure environment may be useful in satisfying industry standards for completing electronic commerce payments securely.

In an embodiment, cookies may be used to identify a common electronic commerce session. For example, when a user accesses the electronic commerce web site to shop, the initial access is provided by the cloud computing environment that establishes a session associated with the user access. The cloud computing environment passes a cookie back to the web browser of the user which the web browser may share to promote the electronic commerce site treating the interactions of the user as a unified and continuing session. When the user navigates to a transaction page and provides confidential information to complete a transaction, the input information may be sent to the secure environment along with the session cookie. The secure environment may initiate communication with the cloud environment and request information about the electronic commerce session based on passing the cookie to identify the session. For example the secure environment may ask for a list of items stored in a virtual shopping cart, pricing information, and shipping information. The secure environment may ask for corroboration that the subject user session is still active, as an additional security check. When the secure environment completes a payment transaction, for example sending a credit card transaction to a credit card issuer, the secure environment may again initiate communication with the cloud computing environment to indicate that payment has been completed, sending along the cookie, to trigger the cloud computing environment to fulfill the electronic commerce purchase, for example filling an order.

Figure 1:
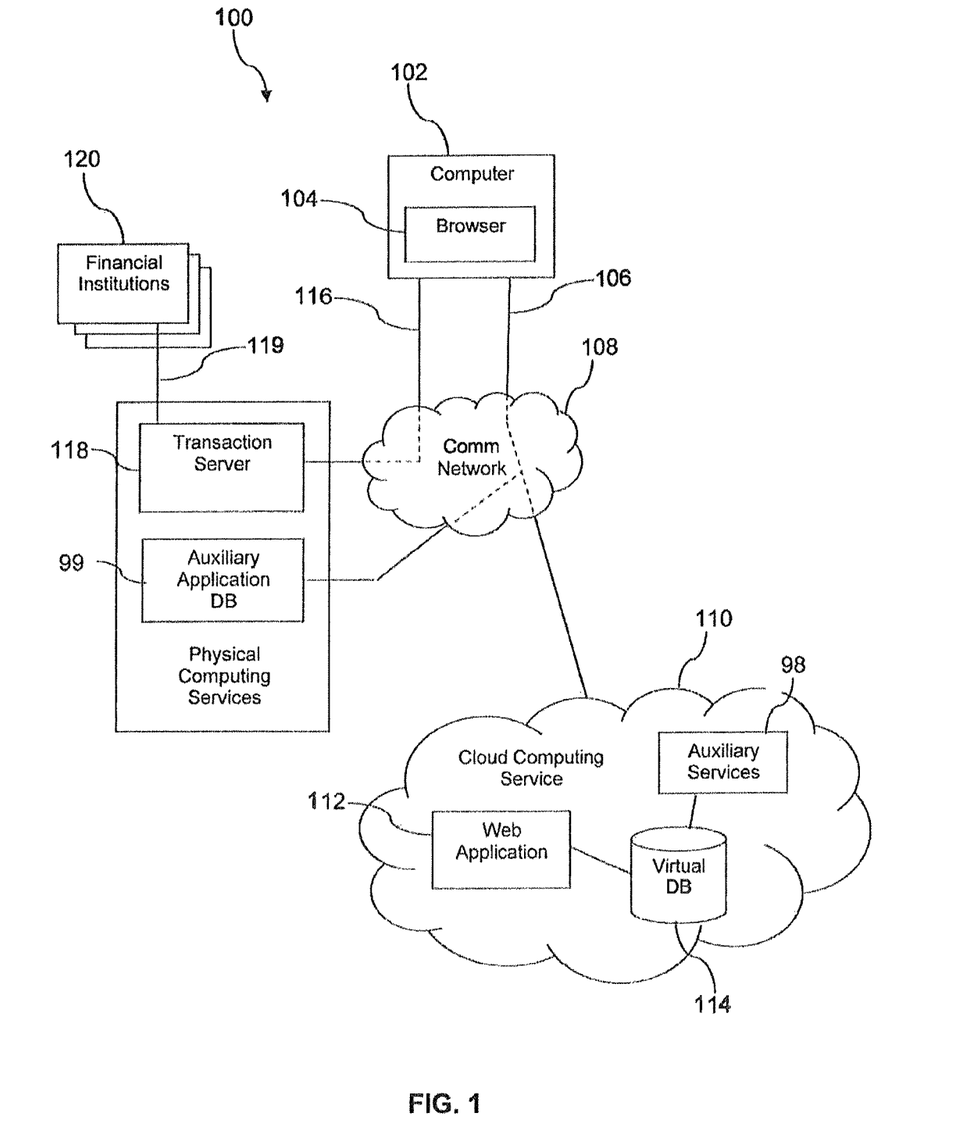
FIG. 1 is an illustration of a system according to an embodiment of the disclosure.

Turning now to FIG. 1, a system 100 according to an embodiment of the invention is shown. The system 100 provides e-commerce in a single domain, hybrid environment that takes advantage of the efficiency, scalability, and flexibility of cloud computing to provide part of the e-commerce experience and relies on secure virtual private network tunnel communications to a secure environment to provide a secure payment mechanism while at the same time providing a unified e-commerce experience for the user. As used herein, 'single domain' refers to the use of a single Internet domain name to access the subject e-commerce site. It is understood that the cloud computing environment portion of the e-commerce site may be accessed using a first sub-domain name that is logically subordinated to the single Internet domain name and the secure environment portion of the e-commerce site may be accessed using a second sub-domain name that is logically subordinated to the single Internet domain name. As used herein, 'hybrid' or 'hybrid environment' refers to the aggregation of a cloud computing environment and a secure environment in providing the services of the e-commerce site.

Link 106 represents the link between computer 102 and cloud computing service 110. The system 100 can support a variety of e-commerce purchases such as purchasing products and services. The system 100 also can support e-commerce purchases of vouchers that are redeemable for product, a purchase of a product, a purchase of a service, a purchase of gift cards, or a purchase of a gift or promotional e-codes. In an embodiment, the principles described with reference to system 100 may be employed for promoting non-ecommerce purchase transactions such as secure handling of health records in accordance with principles and/or regulatory requirements of protecting the personal information included in health records or secure handling of any individual confidential information such as Social Security numbers.

Cloud computing generally comprises providing computing services via a network connection using dynamically scalable computing resources. Cloud computing may be supported, at least in part, by virtualization software. A cloud computing environment may be provided by a third party provider to a plurality of enterprises on a hired, commercial basis. Cloud computing can also be considered computation, software, data access, and storage service that do not require end-user knowledge of the physical location and configuration of the system that delivers the services. While the general concept of cloud computing does not exclude a dynamically scalable computer resource controlled by a single enterprise and accessible only to that enterprise, as used herein, cloud computing refers to cloud computing services provided by and controlled by a third party that are accessible to a plurality of enterprises.

Link 116 represents a VPN link between the computer 102 and a transaction server 118. Computer 102 contains a browser 104. The browser 104 is a software program that fetches HTML documents over an HTTP communication link and renders the HTML documents, for example presenting text and graphics on a display screen coupled to the computer 102. The browser 104 translates the coding language used on the Internet and displays that translation to a user in a web page format. An auxiliary application database 99 may be present in the system 100. The transaction server 118 and the auxiliary application database 99 may be considered to provide physical computing services by way of contrast with the cloud computing services 110. Note that the auxiliary service 98 may communicate with the auxiliary application database 99 via the communication network 108, but this communication path does not route over the link 116 associated with the VPN link. Alternatively, in an embodiment, the transaction server 118 may be provided as a virtual server in executing on one or more computer systems, for example a server farm. Expressed in other words, the secure environment containing the transaction server 118 may initiate communication with the cloud computing service 110, for example for the transaction server 118 to request electronic purchasing information such as product pricing and/or shopping cart contents from the auxiliary service 98 or from other applications within the cloud computing service 110. Some secure payment standards may be satisfied, for example, by constraining communication between the secure environment and the cloud computing service 110 to one-way initiation by the secure environment, for example by the transaction server 118 initiating communication with the auxiliary services 98.

Also, although transaction server 118 is shown connected directly to financial institutions 120, it is understood that this communication link 119 may be via a VPN or other communication link through the communication network 108.

The communication network 108 may be a public voice network, a public data network, a private network, or a combination thereof. A VPN is a data communication service that may be provided over a public network, for example the Internet, that provides some of the features of a true private network, for example security. The security may be provided by encryption or other security mechanisms to ensure that only authorized users have access to the VPN and the data transmitted thereby. The financial institutions 120 may comprise one or more credit card companies, payment services, or other electronic payment functionality.

The browser 104 is able to determine when the user of computer 102 is interacting with product catalogs and/or product descriptions via the application 112 and when the user of computer 102 is attempting to pay. The product information may be accessed via a first portion of the e-commerce web site and/or web page while the payment information may be input to a second portion—the secure environment portion—of the e-commerce web site and/or web page. In an embodiment, the shipping address may be provided to the application 112 in the cloud computing service 110. Alternatively, the shipping address may be provided to the secure environment portion of the e-commerce web site. In this later case, the secure environment, for example the transaction server 118, may initiate communication with the cloud computing services 110 and provide the shipping information along with a session cookie to identify the e-commerce session, and the cloud computing service 110 may fulfill the order, including creating a shipping label based on the shipping address. In an embodiment, the transaction server 118 may communicate with portions of the cloud computing services 110 that are in a relatively more secure arrangement than the portions of the cloud computing services 110 accessible via the browser 104 or other external programs.

In an embodiment, the e-commerce web site may comprise a plurality of web pages. For example, a user may typically enter the e-commerce web site via a store-front or home page. From the home page various other pages may be accessible, including web pages describing products and/or services available through the e-commerce web site. The e-commerce web site may promote a user adding products and/or services to an electronic or virtual shopping cart. When the user is ready to pay, the e-commerce web site may provide a variety of controls to select to complete a payment transaction to pay for the items in the shopping cart and to trigger fulfillment of the user's order. In an embodiment, the control that selects the payment transaction may interact with or engage an embedded web page that is configured to initiate communication with the transaction sever 118 over a virtual private network tunnel from the user's browser, for example link 116, thereby preventing the passage of confidential information related to the payment transaction through the cloud computing service 110. In some contexts, this may be referred to as blocking the internet protocol address of the transaction server 118 and/or other entities of the secure environment. The embedded web page may be provided as an inline frame and/or an iframe web page.

Payment information and shipping address information may be confidential information that is not desired to be shared via cloud computing service 110. Cloud computing service 110 may contain database 114, which can store information about the products and services that may be accessed and/or retrieved by application 112. For example, in response to browser 104 requests triggered by user control inputs to an e-commerce web page, the application 112 may retrieve product description information from the database 114, format this information in HTML, and send the information back to the web browser 104 for presentation on the computer 102.

In some embodiments, database 114 can be a virtual database. In an embodiment, the system 100 complies with electronic payment standards, for example the payment card industry (PCI) level 1 through level 4 Data Security Standard. In that instance, browser 104 is triggered to redirect the confidential information via VPN link 116 to transaction server 118. This confidential information may include financial information, for example credit card numbers and authentication tokens. This confidential information may also include shipping address information and/or other confidential information. The cloud computing service 110 may also support various auxiliary services 98. Cloud computing service 110 may reference the transaction server 118, for example to send an identification of a product item and/or pricing information about the product item, via known URLs that hide the internet protocol address of the transaction server 118. This is handled by the domain name service (DNS) mechanism which can translate the URL to the appropriate physical address. Additionally, physical servers can be load balanced behind virtual internet protocol (IP) addresses to isolate their identity. In part, the PCI Data Security Standard disparages publicly exposing confidential information, as for example exposing confidential information to a cloud computing environment.

In an embodiment, when a user accesses the e-commerce store front, the web application 112 initiates a session and sends back a home page in hypertext markup language (HTML) format or other document format along with a session cookie to the web browser 104 used by the user. The session cookie may be used by the web application 112 to maintain a state of the session between separate communication exchanges with the web browser 104. In an embodiment, the session cookie may be a domain cookie. When a payment transaction is initiated from the web browser 104, for example by sending confidential information via an iframe embedded in a web page, the subject confidential information and session cookie may be transmitted to the transaction server 118 via a virtual private network tunnel from the web browser 104. In an embodiment, the iframe may be a floating iframe. The transaction server 118 may initiate communication with the cloud computing service 110 or a portion of the cloud computing service 110 to obtain information to complete the payment transaction, for example pricing information and product information. The product information may be used, at least in part, to provide documentation attached to the payment transaction recorded by a credit card issuer, for example to provide contextual information for a monthly credit card bill statement. The transaction server 118 may send the session cookie in the initiation message and/or information request message to the cloud computing service 110, whereby the cloud computing service 110 will be able to identify the appropriate e-commerce session based on the session cookie.

In an embodiment, the cloud computing service 110 and the secure environment, including the transaction server 118, are in the same Internet domain, which may be referred to as a first Internet domain, thereby supporting a unified user e-commerce shopping experience. For example, the services provided by the cloud computing service 110 and the secure environment may be accessed through the same Internet domain name, with the cloud computing service 110 being accessed by a first Internet sub-domain name and the secure environment, for example the transaction server 118, being accessed by a second Internet sub-domain name. For example, in an embodiment, the e-commerce site may be accessed with a uniform resource locator (URL) such as www.domain_A.com; the cloud computing service 110 may be accessed with a URL such as www.domain_A.com/subdomain_1/; and the transaction server 118 may be accessed with a URL such as www.domain_A.com/subdomain_2/.

Behind the scenes, for example in part based on the functionality provided by the iframe and/or other embedded web page mechanism, the e-commerce activity is distributed across two different Internet sub-domains. The non-confidential information is conveyed to the web browser 104 from the cloud computing service 110, where the cloud computing service 110 (or at least the e-commerce store front) is located in a first Internet sub-domain of the first Internet domain. The confidential information is conveyed via a virtual private network tunnel between the web browser 104 and the transaction server 118, where the transaction server 118 is located in a second Internet sub-domain of the first Internet domain.

Additionally, various control functions may prevent application 112 from becoming aware of the exact address of the specific transaction server 118. Such control functions could be binding a URL to a control button -- a "Proceed to Checkout" control button, for example -- on the understanding that a URL is not an exact address but may resolve to different addresses based on where the URL is executed or could be a plug-in that provides the intelligence in the browser to make the decision to transfer control.

Figure 2:
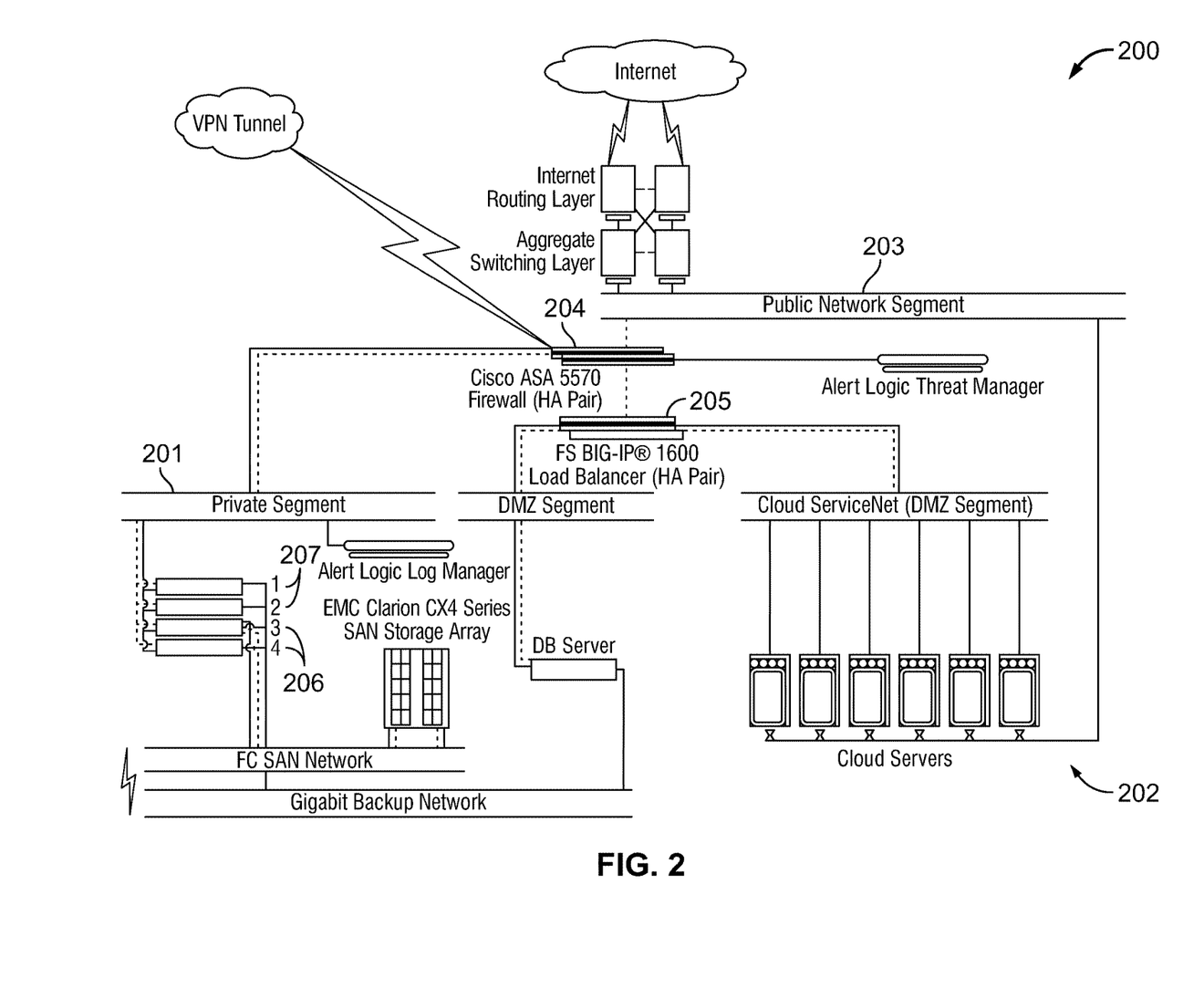
FIG. 2 is an illustration of a system according to an embodiment of the disclosure.

FIG. 2 also shows an embodiment of the disclosure and shows a method and implementation system to host electronic commerce (a/k/a, e-commerce) based in part on using computer platforms that operate in the cloud computing environment.

The use of personal data (i.e., credit cards and billing information) to execute purchases in a cloud computing environment may entail issues with PCI compliance. To obtain compliance with regulations including FISMA, HIPAA and SOX in the United States, the Data Protection Directive in the EU, and the credit card industry's PCI DSS, users may wish to deploy their e-commerce site wholly using private network resources, which are typically more expensive and may offer restricted benefits with reference to deploying at partly using the cloud computing service 110.

As shown in FIG. 2, system 200 is divided between private network segment 201 and cloud service network 202. It is understood that both the private network segment 201 and the public network segment 203 may be located in the same first Internet domain. The public network segment 203 and/or the cloud service network 202 may be located in a first sub-domain of the first Internet domain; and the private network segment 201 may be located in a second sub-domain of the first Internet domain. The application 112 allows users to use public network 203 to read details about products, such as functionality, configurations, specifications, availability, shipping schedules, warranty information, reviews, comparisons, and pricing. Public network 203 also allows a user to search for other vendors of a product or similar products, and to compare products offered by different OEMs. The transaction system that collects personal information to complete the purchase of said products, for example to collect payment account information and shipping address information, is hosted on private, secure network 201.

A firewall 204 is used to hide the transaction servers in the private network segment 201 from the cloud service network 202. A load balancer 205 can be used for high-availability failover and maintains a balanced load of traffic between the application 112 executing in the cloud service network 202 and the database servers 206.

Application servers 207 running behind the firewall 204 are the transaction servers 118 described above with reference to FIG. 1. As shown in FIG. 2, to remain PCI compliant, any cloud-based application, for example the application 112 described above with reference to FIG. 1, is not aware of the exact address of any specific transaction server 118. The transfer of control between the cloud-based application 112 and the transaction servers 118 is managed by the user's browser 104. Additionally, the transaction server 118 may initiate a request for information to the cloud service network 202, and the cloud service network 202 may respond to this request for information to the transaction server 118. In some contexts this may be referred to as "one-way communication."

The customer's personal data (e.g., credit cards, billing information, etc.) are collected and used toward purchases only on the transaction servers 118. After the purchase, the user may resume browsing other product information provided by the cloud-based application 112.

Figure 3:
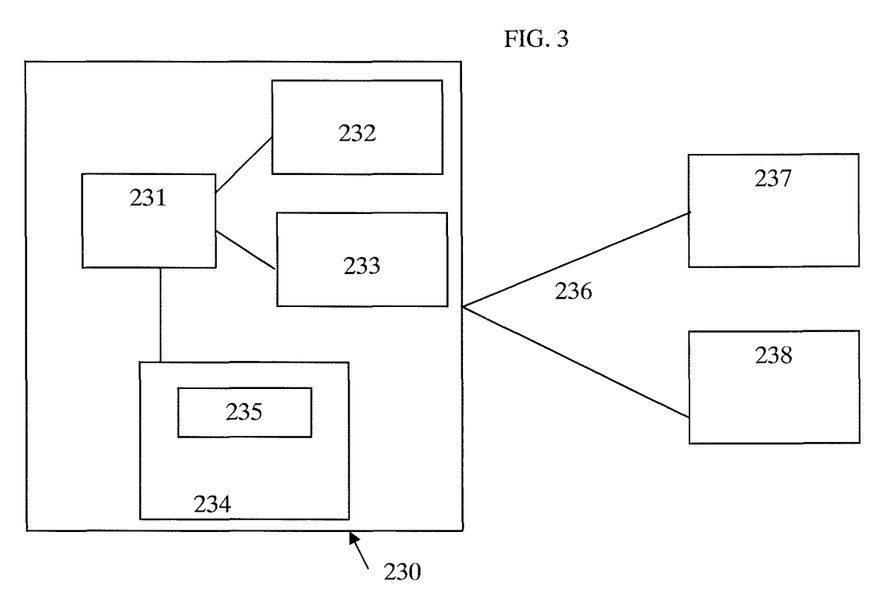
FIG. 3 shows a computer system linked to the internet according to an embodiment of the disclosure.

FIG. 3 shows a personal computer 230 having a processor 231, an input device (such as a key board) 232, and output device (such as a display) 233, a storage device 234 containing a web browser 235, and a communication network 236 to external servers 237 and cloud communication services 238. The personal computer 230 may correspond to the computer 102, and the web browser 235 may correspond to the browser 104 with reference to FIG. 1.

Figure 4:
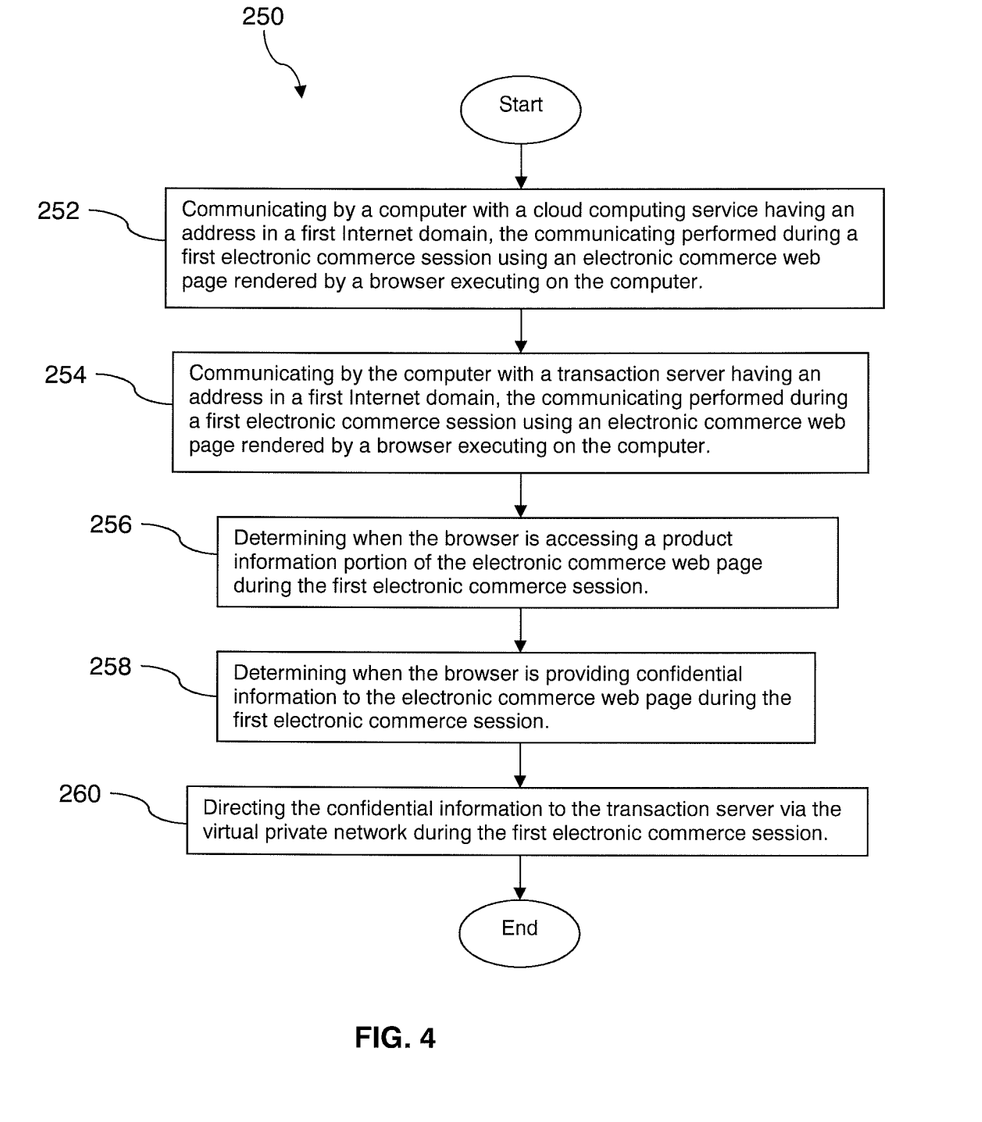
FIG. 4 is a flow chart illustrating a method according to an embodiment of the disclosure.

Turning now to FIG. 4, a method 250 is described. The method 250 begins at block 252 where a computer, for example the computer 102 or the personal computer 230, communicates with a cloud computing service having an address in a first Internet domain and/or associated with the first Internet domain, the communicating performed during a first electronic commerce session using an electronic commerce web page rendered by a browser, for example the browser 104 or the web browser 235, executing on the computer. At block 254, the computer communicates with a transaction server having an address in the first Internet domain via a virtual private network (VPN), the communicating performed during the first electronic commerce session using the electronic commerce web page rendered by the browser. For example the computer 102 communicates with the transaction server 118. At block 256, the computer determines when the browser is accessing a product information portion of the electronic commerce web page during the first electronic commerce session. At block 258, the computer determines when the browser is providing confidential information to the electronic commerce web page during the first electronic commerce session. At block 260, the computer directs the confidential information to the transaction server via the virtual private network during the first electronic commerce session. In an embodiment, the method 250 may further comprise receiving a product or service electronically, for example an electronic voucher or other proof of purchase may be received by the computer from the cloud computing service.

Figure 5:
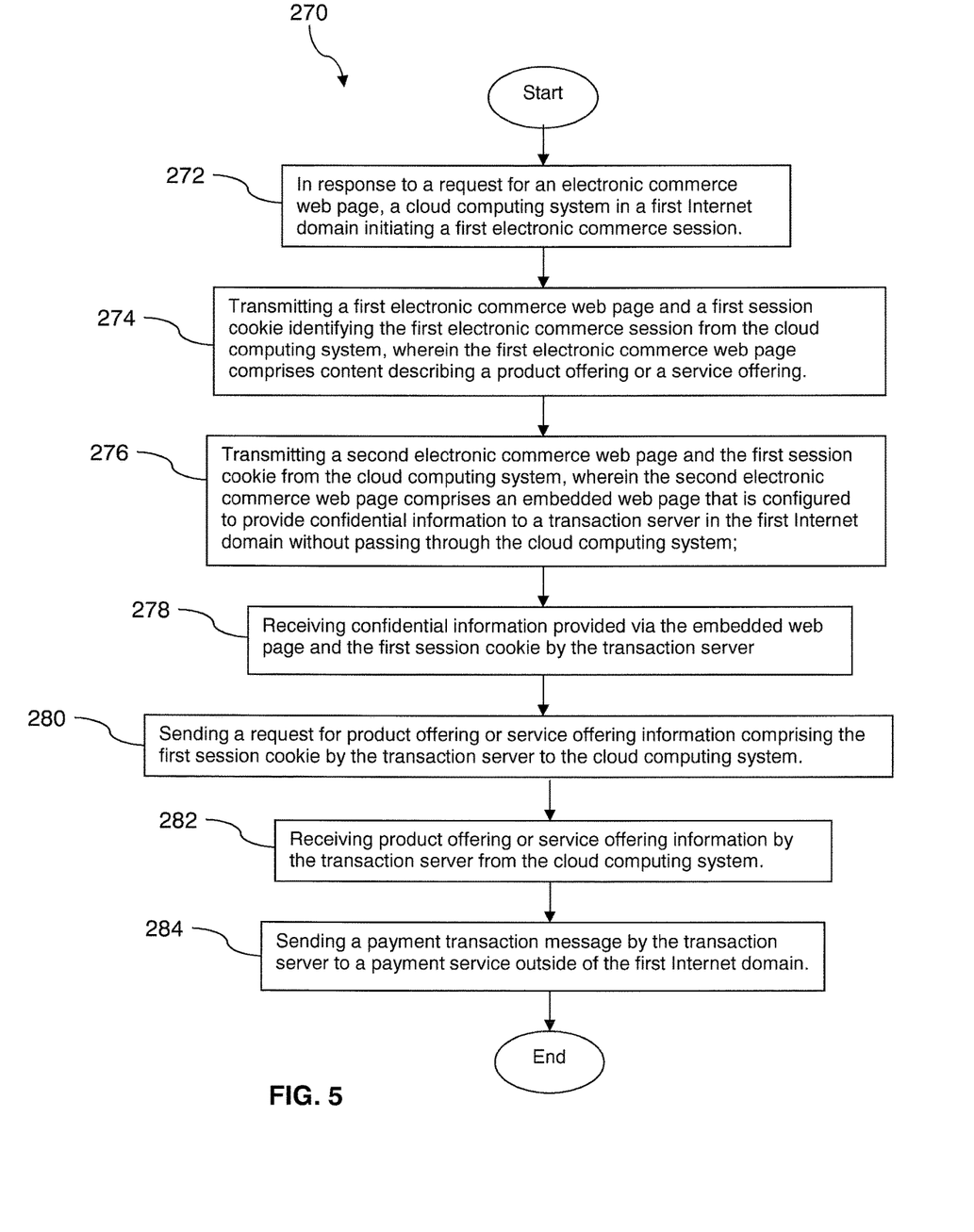
FIG. 5 is a flow chart illustrating a method according to an embodiment of the disclosure.

Turning now to FIG. 5, a method 270 is described. At block 272, in response to a request for an electronic commerce web page, a cloud computing system in a first Internet domain initiates a first electronic commerce session. For example, the cloud computing service 110 and/or the web application 112 initiates the first electronic commerce session and creates a first session cookie for tracking the first electronic commerce session. At block 274, the cloud computing service 110 and/or the web application 112 transmits a first electronic commerce web page and the first session cookie identifying the first electronic commerce session from the cloud computing system, wherein the first electronic commerce web page comprises content describing a product offering or a service offering. In an embodiment, the product offering may be a pre-paid card or voucher for a product that corresponds to a discounted price, for example a half-price voucher for a defined product. Alternatively, the product offering may be a product or a service. The processing of block 274 may be triggered by the browser 104 requesting the subject first electronic commerce web page, for example a home page of an electronic commerce site.

At block 276, the cloud computing service 110 and/or the web application 112 transmits a second electronic commerce web page and the first session cookie from the cloud computing system, wherein the second electronic commerce web page comprises an embedded web page that is configured to provide confidential information to the transaction server 118 in the first Internet domain without passing through the cloud computing system. The processing of block 276 may be triggered by the browser 104 navigating to a payment web page of the electronic commerce web site. At block 278, the transaction server 118 receives confidential information and the first session cookie provided via the embedded web page. The processing of block 278 may be triggered by a user clicking a payment commit button or other like control in the payment web page rendered by the browser 104. In an embodiment, the subject payment web page may comprise an embedded web page that is associated with a virtual private network tunnel connection to the transaction server 118. The embedded web page may be an internal frame such as an iframe and/or a floating iframe.

At block 280, the transaction server 118 sends a request for product offering or service offering information comprising the first session cookie to the cloud computing system, for example to the cloud computing services 110. At block 282, the transaction server 118 receives the product offering or service offering information from the cloud computing system, for example from the cloud computing services 110. At block 284, the transaction server 118 sends a payment transaction message to a payment service outside of the first Internet domain, for example to a credit card issuing company or bank or other payment entity.

In conjunction with the sending of the payment transaction message to the payment service, the transaction server 118 may also send a fulfillment message to the cloud computing service 110 and/or to the web application 112 to direct that the electronic commerce purchase be fulfilled. The fulfillment message may include a shipping address that may be used by the cloud computing service 110 to label a shipping carton or package in the course of completing the e-commerce order fulfillment. In an embodiment, the transaction server 118 may initiate communication with computing resources within the cloud computing service 110 that are not accessible from the browser 104. These computing resources may constitute a quasi-secure environment within the cloud computing service 110.

In an embodiment, the electronic commerce system 100 may promote product offerings that are contingent on a minimum number of purchases being made by different customers. For example, a discounted price for purchasing a product may be dependent on at least 10 different customers purchasing the product. In this case, the transaction server 118 may hold payment transactions until the minimum number of purchases have been committed. In an embodiment, the transaction server 118 may keep track of the number of purchases associated with a minimum order deal and complete all pending transactions that had been holding until the minimum number of purchase orders had been received. Alternatively, the cloud computing services 110 keep track of the number of purchases that have been requested and conveys the number of pending payments to the transaction server 118 when the transaction server 118 requests information from the cloud computing services 110 and/or the web application 112 pursuant to receiving a payment transaction. In either case, when the minimum number of orders has been received the transaction server 118 completes the payment transaction for each of the pending orders and sends a corresponding fulfillment message to the cloud computing services 110 and/or to the web application 112.

In an embodiment, the minimum number of purchases associated with a product offering may further be associated with a maximum time limit to accumulate orders to achieve the minimum number of orders. If the time expires before the minimum number of orders are received, the pending orders are unwound, for example the transaction server 118 informs the cloud computing services 110 and/or the web application 112 that each of the pending purchases, for example as identified by a session cookie or other identification, has been cancelled. The cloud computing services 110 and/or the web application 112 may send notification to the users whose orders have been cancelled. In embodiment, the offering may also have an upper limit, for example a maximum of 100 offerings of a discounted price for a product. The cloud computing services 110 and/or the web application 112 may manage this count and cancel an order that exceeds the maximum number of offerings.

Figure 6:
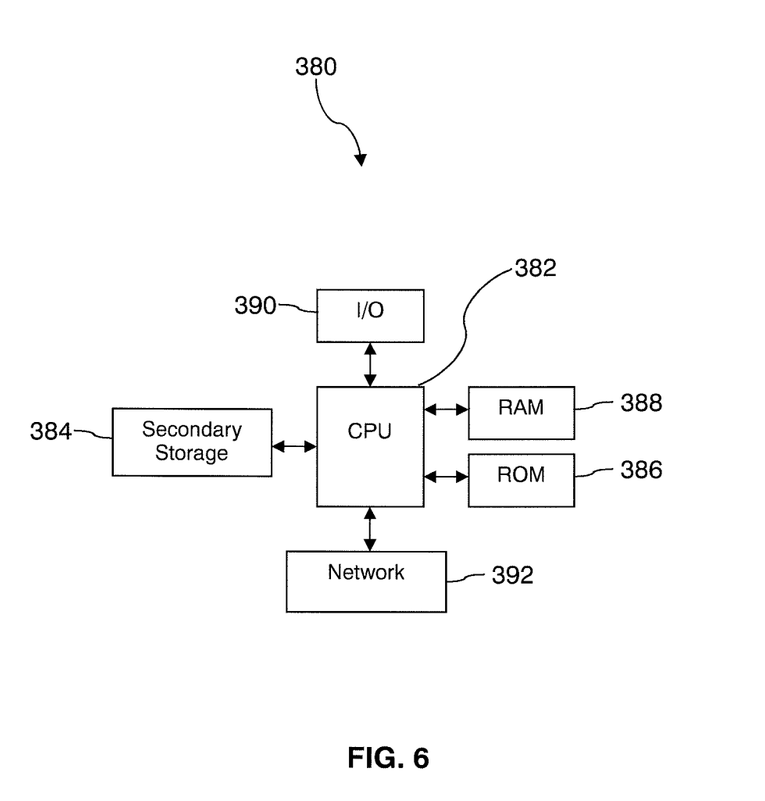

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electronic commerce system, comprising:
   a third party provided cloud computing service using dynamically scalable resources associated with a first Internet address domain, wherein the third party provided cloud computing service using dynamically scalable resources provides product information, via a product information application;
   a secure payment system comprising a plurality of transaction servers associated with the first Internet address domain;
   the plurality of transaction servers of the secure payment system executes a payment application and a payment transaction action, wherein the payment transaction action includes receiving payment information, requesting product information, receiving product information, and sending a secured payment transaction, wherein the payment transaction is held until a minimum number of purchases have been committed;
   the cloud computing service:
   establishes a first electronic commerce session; and provides a web page content and a first session cookie identifying the first electronic commerce session to a browser executing on a computer in a second Internet address domain different from the first Internet address domain;

the secure payment system:

receives payment information and the first session cookie from the browser, via a virtual private network (VPN) connection established between the browser and the plurality of transaction servers of the secure payment system;

sends a request for product information associated with the first electronic commerce session to the third party provided cloud computing service;

receives product information associated with the first electronic commerce session from the third party provided cloud computing service; and sends the secured payment transaction to a payment service based on the payment information and based on the product information associated with the first electronic commerce session, wherein the request comprises the first session cookie.

2. The system of claim 1, wherein the cloud computing service is unaware of the internet protocol address of the plurality of transaction servers.

3. The system of claim 1, wherein at least a portion of the dynamically scalable resources is not accessible by the browser, wherein one or more of the plurality of transaction servers of the secure payment system sends the request for product information associated with the first electronic commerce session to the portion of the dynamically scalable resources which is not accessible by the browser.

4. The system of claim 3, wherein the portion of the dynamically scalable resources which is not accessible by the browser is configured to accept the request only from the secure payment system.

5. The system of claim 1, wherein one or more of the plurality of transaction servers of the secure payment system is configured to send a payment transaction notification to the third party provided cloud computing service using dynamically scalable resources.

6. The system of claim 1, wherein a shopping cart is associated with the first electronic commerce session.

* * * * *